United States Patent
Ikeda et al.

(10) Patent No.: US 9,197,812 B2
(45) Date of Patent: Nov. 24, 2015

(54) IMAGE PROCESSING DEVICE, IMAGE PROCESSING METHOD, AND IMAGING APPARATUS

(71) Applicant: OLYMPUS CORPORATION, Tokyo (JP)

(72) Inventors: Hideru Ikeda, Tokyo (JP); Akira Ueno, Tokyo (JP)

(73) Assignee: OLYMPUS CORPORATION, Tokyo (JP)

( * ) Notice: Subject to any disclaimer, the term of this patent is extended or adjusted under 35 U.S.C. 154(b) by 0 days.

(21) Appl. No.: 14/454,313

(22) Filed: Aug. 7, 2014

(65) Prior Publication Data
US 2015/0092074 A1 Apr. 2, 2015

(30) Foreign Application Priority Data
Oct. 2, 2013 (JP) .................................. 2013-207603

(51) Int. Cl.
*H04N 1/40* (2006.01)
*H04N 5/232* (2006.01)

(52) U.S. Cl.
CPC ........... *H04N 5/23229* (2013.01); *H04N 5/232* (2013.01)

(58) Field of Classification Search
CPC ...... H04N 5/23229; H04N 3/155; H04N 1/40
USPC ........................................ 348/207.99, 222.1
See application file for complete search history.

(56) References Cited

U.S. PATENT DOCUMENTS

2013/0321678 A1* 12/2013 Cote et al. ..................... 348/251
2013/0321679 A1* 12/2013 Lim et al. ..................... 348/256

FOREIGN PATENT DOCUMENTS

JP 10-334225 A 12/1998

* cited by examiner

*Primary Examiner* — Tuan Ho
(74) *Attorney, Agent, or Firm* — Westerman, Hattori, Daniels & Adrian, LLP (57) ABSTRACT

An image processing device includes a plurality of clock selection units configured to select a clock signal to be supplied to each of a plurality of calculation units forming a pipeline from a plurality of clock signals and output the clock signal to the calculation unit, a data delivery unit disposed on the pipeline between the calculation unit to which a first clock signal is input and the calculation unit to which a second clock signal is input, and a control unit configured to control a selection of the clock signal and a combination and a disposition order of the data delivery unit and the calculation units forming the pipeline in accordance with an operation mode of image processing.

9 Claims, 6 Drawing Sheets

IMAGE PROCESSING DEVICE, IMAGE PROCESSING METHOD, AND IMAGING APPARATUS

BACKGROUND OF THE INVENTION

1. Field of the Invention

The present invention relates to an image processing device, an image processing method, and an imaging apparatus.

Priority is claimed on Japanese Patent Application No. 2013-207603, filed Oct. 2, 2013, the content of which is incorporated herein by reference.

2. Description of Related Art

In recent years, with high functionalization of imaging apparatuses such as digital still cameras or video cameras, image processing on image data of photographed images has become complicated. In processing flows of general imaging apparatuses, an imaging processing unit first performs an imaging process on a pixel signal of a photographed image captured by an imaging element and temporarily stores the image data subjected to the imaging process in a memory. Subsequently, an image processing unit reads the image data subjected to the imaging process and stored in the memory, performs various kinds of image processing such as an image-quality improvement process, and stores the image data subjected to the image processing in the memory again. Thereafter, for example, when the image data subjected to the image processing is displayed on a display device, a display processing unit reads the image data stored in the memory, performs a display conversion process, and displays the image data on the display device.

In a series of processing flows of the imaging apparatuses, content of the image processing performed on the image data subjected to the imaging process by the image processing unit differs according to setting of an operation mode or the like of the imaging apparatuses. For example, in image processing for generating a contracted image corresponding to a photographed image, i.e., a thumbnail image, calculation processes such as an OB (optical black)/WB (white balance) process, three-plate processing, a noise reduction process, lowpass filter (LPF) processing, a contraction process, and a color conversion process are sequentially performed to generate a thumbnail image. For example, in image processing for generating a partially expanded image partially expanded from a photographed image, i.e., a digital zoom image, calculation processes such as an OB/WB process, three-plate processing, a noise reduction process, an expansion process, and an edge enhancement process are sequentially performed to generate a digital zoom image.

Thus, in the image processing unit included in the imaging apparatus, content of the image processing or an order in which the image processing is performed on the image data subjected to the imaging process, i.e., a calculation process, is different for each image processing to be performed. Therefore, in the image processing unit, a processing form is realized such that each calculation unit blocked for each piece of content of the calculation process to be performed is prepared, a pipeline in which the plurality of calculation units are connected in series is configured, and a series of various kinds of image processing is realized. In the processing form of the pipeline, the calculation units perform the calculation process in parallel in such a manner that the calculation units on the front stages perform the calculation process on the image data in each pixel or each of the regions divided from an image and sequentially deliver the image data subjected to the calculation process to the calculation units on the rear stages.

In the image processing unit, various different kinds of image processing are dealt with according an operation mode or the like of the imaging apparatus by transposing the calculation units forming the pipeline and the order of the calculation processes performed in the pipeline. Therefore, the image processing unit is configured such that a combination of the calculation units forming the pipeline or the order in which the calculation units are disposed on the pipeline can be transposed freely according to various kinds of image processing to be performed. At this time, in the image processing unit, it is necessary to synchronize delivery of the image data between the calculation units forming the pipeline.

For example, the technology disclosed in Japanese Unexamined Patent Application, First Publication No. H10-334225 discloses an image processing apparatus configured such that buffers receiving image data output from front processing stages and transferring the received image data to rear processing stages are disposed between the processing stages corresponding to calculation units that perform a calculation process. In the image processing apparatus disclosed in Japanese Unexamined Patent Application, First Publication No. H10-334225, a double buffer is configured by two buffers, and a control device controls changeover of the double buffer and starting of a process performed on the image data by each processing stage. Further, in the image processing apparatus disclosed in Japanese Unexamined Patent Application, First Publication No. H10-334225, a series of processes of a pipeline is realized in such a manner that the image data processed by the processing stages is sequentially delivered via the double buffer so that the image data processed by a front processing stage is sent to a subsequent processing stage via the double buffer and the image data processed by the subsequent processing stage is sent to a further subsequent processing stage via the double buffer. Furthermore, in the image processing apparatus disclosed in Japanese Unexamined Patent Application, First Publication No. H10-334225, the processing stages sequentially output the image data, so that the processing stages operate simultaneously in parallel.

In the series of image processing for which the pipeline is configured, a processing amount of the calculation process to be performed by each calculation unit is different according to the data amount of a calculation target image data. The data amount of a calculation target image data is different according to, for example, the size of an image to be subjected to a calculation process or the size of a region in the image to be subjected to a calculation process. Therefore, for example, in the calculation unit of which a processing amount is small, there is a non-processing time called a waiting time, an idle time, a standby time, a slack time, or the like in which the image data is not actually processed.

SUMMARY OF THE INVENTION

According to a first aspect of the present invention, an image processing device which includes a plurality of calculation units performing a calculation process on input image data and outputting the image data, changes at least one of a combination of the calculation units forming a pipeline and an order of the calculation units disposed on the pipeline in accordance with setting of an operation mode of image processing, and performs the image processing in accordance with the setting of the operation mode of the image processing, the image processing device includes: a plurality of clock selection units configured to respectively correspond to the calculation units forming the pipeline and to select a clock signal to be supplied to the corresponding calculation unit from a plurality of input clock signals and output the clock signal; a data delivery unit disposed on the pipeline between the calculation unit to which a first clock signal is input and the calculation unit to which a second clock signal with a frequency different from a frequency of the first clock signal is input and configured to output the image data subjected to the calculation process and output at a timing of one of the first and second clock signals, at a timing of another of the first and second clock signals; and a control unit configured to control a selection of the clock signal by each of the clock selection units, a combination of the data delivery unit and the calculation units forming the pipeline, and an order of the data delivery unit and the calculation units disposed on the pipeline in accordance with the operation mode of the image processing.

According to a second aspect of the present invention, the image processing device according to the first aspect of the present invention may further include a clock generation unit configured to generate the second clock signal based on the first clock signal. The control unit may control the frequency of the second clock signal generated by the clock generation unit.

According to a third aspect of the present invention, in the image processing device according to the second aspect of the present invention, the control unit may control the frequency of the second clock signal generated by the clock generation unit based on at least one of the setting of the operation mode of the image processing, a set value appropriate to content of the image processing performed by the image processing device, and a range of the image processing performed on the image data by the image processing device.

According to a fourth aspect of the present invention, in the image processing device according to the third aspect of the present invention, the control unit may control the clock generation unit such that the second clock signal with the frequency lower than the frequency of the first clock signal is generated.

According to a fifth aspect of the present invention, in the image processing device according to the fourth aspect of the present invention, the operation mode of the image processing may be setting in which a contracted image contracted from an image configured by the image data is generated. The control unit may determine the frequency of the second clock signal based on a set value of a contraction ratio when the image is contracted, cause each of the clock selection units disposed on the pipeline and corresponding to the calculation unit performing a contraction process and the calculation unit on a front stage of the calculation unit performing the contraction process to select the first clock signal, and cause each of the clock selection units disposed on the pipeline and corresponding to the calculation units on a rear stage of the calculation unit performing the contraction process to select the second clock signal.

According to a sixth aspect of the present invention, in the image processing device according to the fourth aspect of the present invention, the operation mode of the image processing may be setting in which a partially expanded image which is partially expanded from an image configured by the image data is generated. The control unit may determine the frequency of the second clock signal based on a set value of an expansion ratio when the image is expanded, cause each of the clock selection units disposed on the pipeline and corresponding to the calculation unit performing an expansion process and the calculation unit on a front stage of the calculation unit performing the expansion process to select the second clock signal, and cause each of the clock selection units disposed on the pipeline and corresponding to the calculation units on a rear stage of the calculation unit performing the expansion process to select the first clock signal.

According to a seventh aspect of the present invention, in the image processing device according to the fourth aspect of the present invention, the operation mode of the image processing may be setting in which a distortion-corrected image obtained by correcting distortion of an image configured by the image data is generated. The control unit may determine the frequency of the second clock signal based on a set value of a distortion correction amount when the distortion of the image is corrected, cause each of the clock selection units disposed on the pipeline and corresponding to the calculation unit performing a distortion correction process and the calculation unit on a front stage of the calculation unit performing the distortion correction process to select the first clock signal, and cause each of the clock selection units disposed on the pipeline and corresponding to the calculation units on a rear stage of the calculation unit performing the distortion correction process to select the second clock signal.

According to an eighth aspect of the present invention, an image processing method performed by an image processing device which includes a plurality of calculation units performing a calculation process on input image data and outputting the image data, changes at least one of a combination of the calculation units forming a pipeline and an order of the calculation units disposed on the pipeline in accordance with setting of an operation mode of image processing, and performs the image processing in accordance with the setting of the operation mode of the image processing, the image processing method includes: selecting, by a plurality of clock selection units respectively corresponding to the calculation units forming the pipeline, a clock signal to be supplied to the corresponding calculation unit from a plurality of input clock signals and outputting the clock signal; outputting, by a data delivery unit disposed on the pipeline between the calculation unit to which a first clock signal is input and the calculation unit to which a second clock signal with a frequency different from a frequency of the first clock signal is input, the image data subjected to the calculation process and output at a timing of one of the first and second clock signals, at a timing of another of the first and second clock signals; and controlling, by a control unit, a selection of the clock signal by each of the clock selection units, a combination of the data delivery unit and the calculation units forming the pipeline, and an order of the data delivery unit and the calculation units disposed on the pipeline in accordance with the operation mode of the image processing.

According to a ninth aspect of the present invention, an imaging apparatus includes: a solid-state imaging device configured to include a plurality of pixels and output a pixel signal obtained by photoelectrically converting a signal of each of the pixels in accordance with incident subject light; a storage unit that stores image data in accordance with the pixel signal output by the solid-state imaging device; and the image processing device according to any one of the first aspect to the seventh aspect of the present invention configured to perform the image processing on the image data stored in the storage unit in accordance with the setting of the operation mode of the image processing.

DETAILED DESCRIPTION OF THE INVENTION

Figure 1:
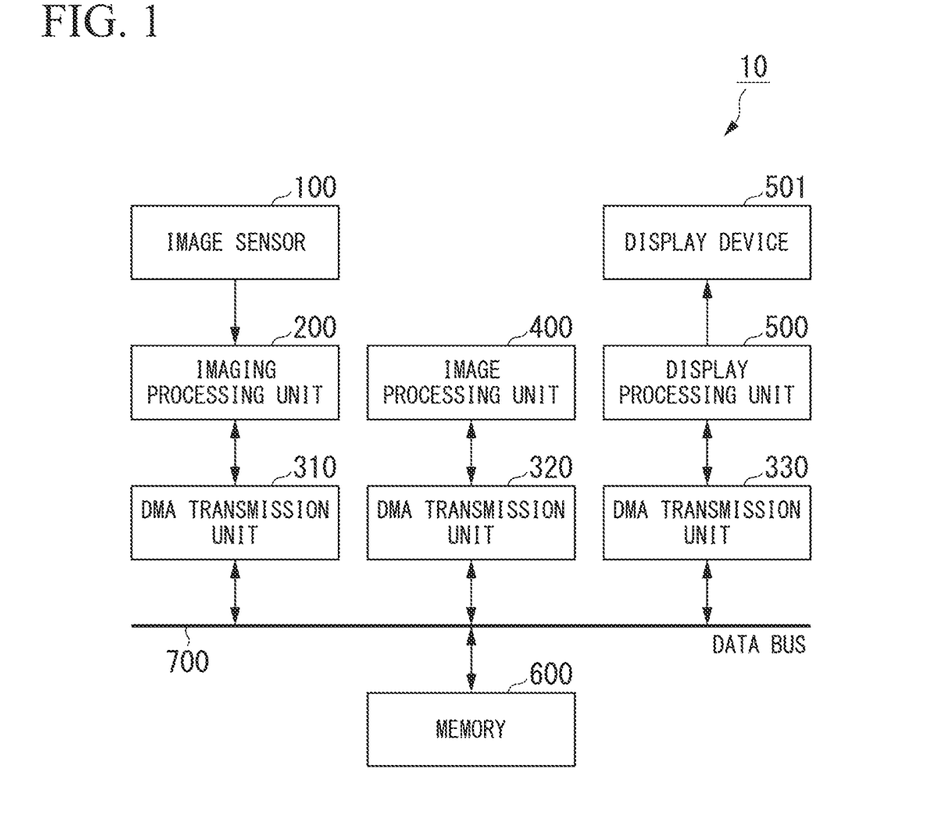
FIG. 1 is a block diagram illustrating an overall configuration of an imaging apparatus according to an embodiment of the present invention.

Hereinafter, an embodiment of the present invention will be described with reference to the drawings. FIG. 1 is a block diagram illustrating an overall configuration of an imaging apparatus according to the embodiment. An imaging apparatus 10 illustrated in FIG. 1 includes an image sensor (solid-state imaging device) 100, an imaging processing unit 200, a Direct Memory Access (DMA) transmission unit (image processing device) 310, an image processing unit (image processing device) 400, a DMA transmission unit (image processing device) 320, a display processing unit 500, a display device 501, a DMA transmission unit (image processing device) 330, and a memory (storage unit) 600.

The DMA transmission unit 310, the DMA transmission unit 320, the DMA transmission unit 330, and the memory 600 in the imaging apparatus 10 are connected to each other via a data bus 700, and image data is stored (written) in the memory 600 and acquired (read) from the memory 600 through DMA transmission.

The image sensor 100 is a solid-state imaging device typified by an image sensor such as a charge coupled device (CCD) image sensor or a complementary metal-oxide semiconductor (CMOS) image sensor that photoelectrically converts an optical image of a subject formed as an image by a lens (not illustrated). The image sensor 100 outputs a pixel signal of a photographed image obtained by imaging, i.e., a pixel signal of each pixel according to incident subject light, to the imaging processing unit 200. The description will be made below assuming that the image sensor 100 is a solid-stage imaging device in which color filters with the Bayer array are pasted to an imaging surface and a pixel signal of a photographed image with the Bayer array is output to the imaging processing unit 200.

The imaging processing unit 200 generates image data (hereinafter referred to as "imaging-processed data") with the Bayer array subjected to the imaging process by performing various processes, e.g., analog/digital (A/D) conversion, pixel defect correction, shading correction, and dark-current correction, on the pixel signal of the photographed image with the Bayer array input from the image sensor 100. Then, the imaging processing unit 200 outputs the generated imaging-processed data to the DMA transmission unit 310.

The DMA transmission unit 310 stores (writes) the imaging-processed data input from the imaging processing unit 200 in the memory 600 through the DMA transmission. The DMA transmission unit 320 acquires (reads) the imaging-processed data stored in the memory 600 by the DMA transmission unit 310 and outputs the acquired imaging-processed data to the image processing unit 400.

The image processing unit 400 generates image data (hereinafter referred to as "image-processed data") subjected to image processing by performing various kinds of predetermined image processing on the imaging-processed data with the Bayer array input from the DMA transmission unit 320. Then, the image processing unit 400 outputs the generated image-processed data to the DMA transmission unit 320.

The image processing performed by the image processing unit 400 is a process in which various calculation processes, e.g., an optical black (OB)/white balance (WB) process, three-plate processing (demosaicing process), a noise reduction process, lowpass filter (LPF) processing, a contraction process, a color conversion process, an expansion process, an edge enhancement process, a distortion correction process, and an image-quality improvement process, are combined.

The OB/WB process is a process of correcting a black level (OB) of a photographed image or correcting a white balance (WB) thereof. The three-plate processing is a process of converting image data with the Bayer array into Y (luminance) data, and Cb (color difference: blue) data and Cr (color difference: red) data through a YC conversion process or converting the image data into red (R) data, green (G) data, and blue (B) data through an RGB conversion process. The noise reduction process is a process of reducing noise of an entire image. The LPF process is a process of suppressing a high-frequency component in an image. The contraction process is a process of generating a contracted image obtained by contracting an image. The color conversion process is a process of converting a color tinge of an entire image. The expansion process is a process of generating an expanded image obtained by expanding an image entirely or partially. The edge enhancement process is a process of generating an image in which the position of an edge with a large variation in luminance or color in the image is enhanced. The distortion correction process is a process of correcting distortion of an optical system. The image-quality improvement process is a process of improving the quality of an image. In the embodiment, none of the calculation processes when the image processing unit 400 performs the image processing are limited.

Therefore, the image processing unit 400 includes a plurality of calculation units performing the above-described calculation processes and forms a pipeline in which the calculation units necessary to perform the image processing are connected in series based on setting of an operation mode or the like of the image processing in the imaging apparatus 10 so that a series of various kinds of image processing is performed. At this time, the image processing unit 400 freely transposes a combination of the calculation units forming the pipeline or an order of the calculation units disposed on the pipeline, i.e., the order in which the calculation processes are performed, according to content of the image processing performed on the imaging-processed data by the imaging apparatus 10. As a combination of the calculation units forming the pipeline or a configuration in which the order of the calculation units disposed on the pipeline is transposed, for example, a configuration in which crossbar switches switching physical connection between the calculation units performing the calculation processes are used can be considered. In the embodiment, however, the configuration for forming the pipeline in the image processing unit 400 is not limited. The more detailed configuration of the image processing unit 400 will be described below.

The DMA transmission unit 320 stores (writes) the image-processed data input from the image processing unit 400 in the memory 600 through the DMA transmission. The DMA transmission unit 330 acquires (reads) the image-processed data stored in the memory 600 by the DMA transmission unit 320 and outputs the acquired image-processed data to the display processing unit 500.

The display processing unit 500 performs a re-sizing process of contracting the image of the image-processed data input from the DMA transmission unit 330 to obtain an image with a size which can be displayed by the display device 501 or a display conversion process such as a superimposition process of superimposing data for On-Screen Display (OSD) display, and then outputs the image-processed data subjected to the display conversion process to the display device 501.

The display device 501 is a display device such as a thin film transistor (TFT)-liquid crystal display (LCD) or an organic electro-luminescence (EL) display, and displays an image according to the image-processed data subjected to the display process and output from the display processing unit 500.

The display device 501 may be a display device such as an electronic view finder (EVF) or an external display such as a television. In FIG. 1, the display device 501 is also a constituent element of the imaging apparatus 10. However, the display device 501 may be configured to be detachably mounted on the imaging apparatus 10.

The memory 600 is a memory such as a dynamic random access memory (DRAM) accessed by each constituent element included in the imaging apparatus 10. The memory 600 temporarily stores various kinds of data during the process of each constituent element in the imaging apparatus 10.

In FIG. 1, each of the DMA transmission unit 310, the DMA transmission unit 320, and the DMA transmission unit 330 in the imaging apparatus 10 is configured to access the memory 600 via the data bus 700. However, for example, access control to the memory 600 may be configured to be performed by a memory controller (not illustrated). In this case, each of the DMA transmission units in the imaging apparatus 10 outputs an access request made to the memory 600 in the DMA transmission to the memory controller, and the memory controller performs control such that data is stored (written) in the connected memory 600 and data is acquired (read) from the memory 600 according to the access request input from each of the DMA transmission units and made to the memory 600 in the DMA transmission.

For example, the image-processed data subjected to the image processing by the image processing unit 400 and stored in the memory 600 by the DMA transmission unit 320 may be configured to be acquired (read) by the DMA transmission unit corresponding to a record processing unit (not illustrated) and to be recorded in a recording medium (not illustrated) detachably mounted on the imaging apparatus 10 by the record processing unit (not illustrated). Here, as the recording medium, for example, an SD memory card or a CompactFlash (CF) (registered trademark) can be considered. Further, for example, the image-processed data recorded in the recording medium (not illustrated) can be considered to be subjected to image processing such as a JPEG compression process by the calculation unit included in the image processing unit 400.

In this configuration, the imaging apparatus 10 temporarily stores the imaging-processing data, which is obtained by the imaging processing unit 200 performing the imaging process on the pixel signal of a subject photographed by the image sensor 100, in the memory 600. Subsequently, the imaging apparatus 10 stores the image-processed data, which is obtained by the image processing unit 400 performing image processing on the imaging-processed data stored in the memory 600, in the memory 600 again. Thereafter, the imaging apparatus 10 displays the image-processed data, which is obtained by the display processing unit 500 performing the display process on the image-processed data stored in the memory 600, on the display device 501. Each constituent element in the imaging apparatus 10 is controlled by, for example, a control unit (not illustrated) such as a central processing unit (CPU).

Figure 2:
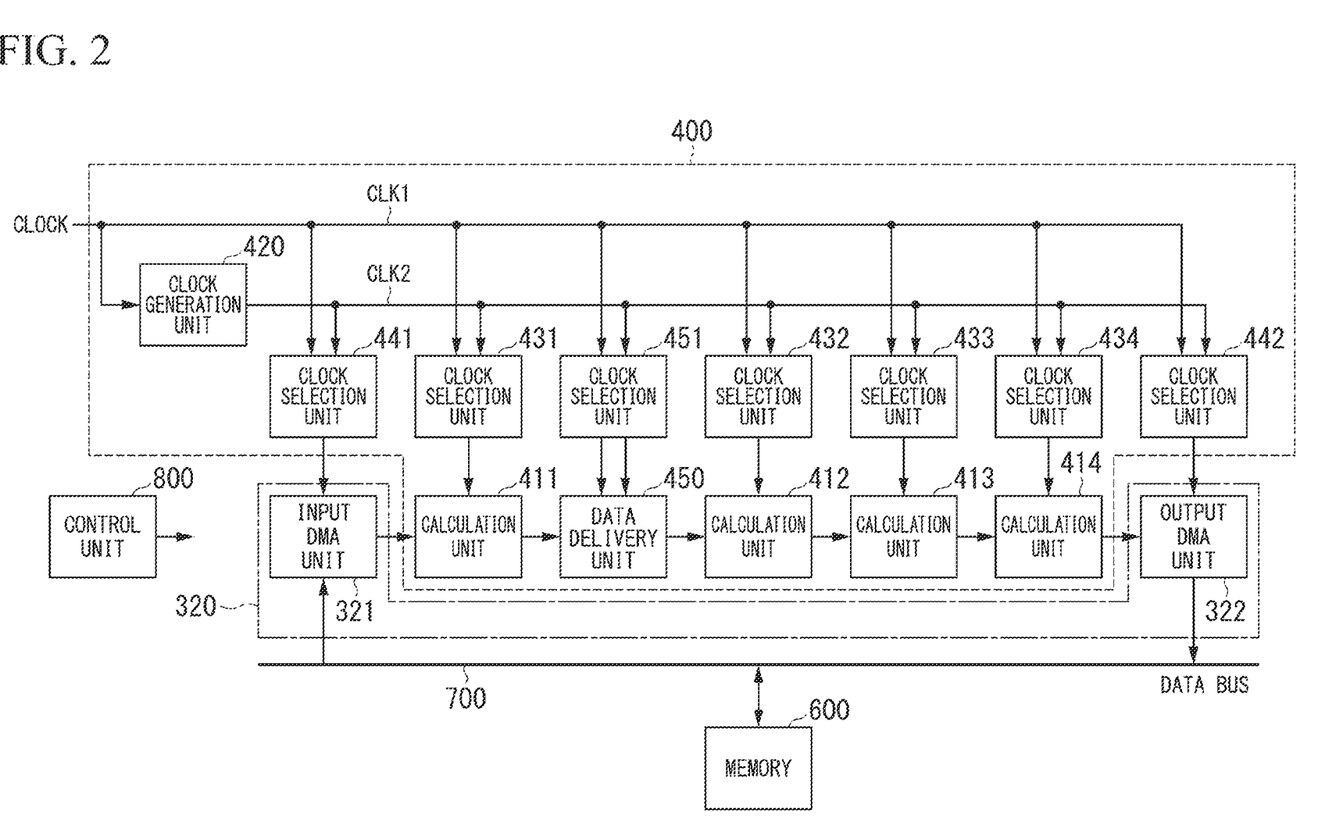
FIG. 2 is a block diagram illustrating an example of the configuration of an image processing unit included in the imaging apparatus according to the embodiment.

Next, the image processing unit 400 included in the imaging apparatus 10 will be described. FIG. 2 is a block diagram illustrating an example of the configuration of the image processing unit 400 included in the imaging apparatus 10 according to the embodiment. FIG. 2 illustrates an example of the configuration of the image processing unit 400 including four calculation units that perform a calculation process. In FIG. 2, the constituent elements relevant to the image processing unit 400, such as the DMA transmission unit 320, the data bus 700, the memory 600, and a control unit (image processing device) 800, are also illustrated together. FIG. 2 illustrates the configuration of the DMA transmission unit 320 in which an input DMA unit (image processing device) 321 acquires (reads) the imaging-processed data stored in the memory 600 and outputs the imaging-processed data to the image processing unit 400, and an output DMA unit (image processing device) 322 stores (writes) the image-processed data output by the image processing unit 400 in the memory 600.

The image processing unit 400 illustrated in FIG. 2 includes four calculation units (image processing devices) 411 to 414, a clock generation unit (image processing device) 420, a data delivery unit (image processing device) 450, seven clock selection units (image processing devices) 431 to 434, 441, 442, and 451.

Each of the calculation units 411 to 414 is a calculation circuit that performs a calculation process in the image processing performed by the image processing unit 400, performs the calculation process on the input image data, and outputs the image data subjected to the calculation process. For the calculation units 411 to 414, a combination of the calculation units at the time of formation of a pipeline in the image processing unit 400 or an order of the calculation units disposed on the pipeline is changed under the control of the control unit 800.

FIG. 2 illustrates an example in which the calculation units 411 to 414 are disposed on the pipeline in the image processing unit 400 in the order of the calculation unit 411, the calculation unit 412, the calculation unit 413, and the calculation unit 414. In the disposition of the pipeline, the imaging-processed data acquired (read) and output from the memory 600 by the input DMA unit 321 in the DMA transmission unit 320 is initially subjected to the calculation process by the calculation unit 411 disposed at the initial stage of the pipeline first, and the image data subjected to the calculation process by the calculation unit 411 is subjected to the calculation process sequentially in the order of the calculation unit 412, the calculation unit 413, and the calculation unit 414. Then, the image-processed data processed by the calculation unit 414 disposed at the final stage of the pipeline is stored (written) in the memory 600 by the output DMA unit 322 in the DMA transmission unit 320.

Since the content of the calculation process performed by each of the calculation units 411 to 414 is the same as the content of the calculation process performed by each of the calculation units included in an image processing unit of the related art, the detailed description will be omitted.

The data delivery unit 450 is a buffer that delivers the image data between the calculation unit on the front stage and the calculation unit on the rear stage connected to the data delivery unit 450. For example, the data delivery unit 450 is configured as a memory such as a dual port (two-port) static random access memory (SRAM) that can write and read the image data at different timings The data delivery unit 450 transfers the image data on which the calculation unit on the front stage has performed the calculation process to the calculation unit on the rear stage, by storing the image data at a timing at which the calculation unit on the front stage outputs the image data and by outputting the stored image data at a timing at which the image data is input to the calculation unit on the rear stage.

The data delivery unit 450 is a constituent element forming the pipeline as in the calculation units 411 to 414 and the disposition of the data delivery unit 450 on the pipeline configured in the image processing unit 400, i.e., the disposition thereof between the calculation units is changed under the control of the control unit 800. FIG. 2 illustrates an example in which the data delivery unit 450 is disposed between the calculation unit 411 and the calculation unit 412 on the pipeline in the image processing unit 400. More specifically, FIG. 2 illustrates an example in which the calculation units 411 to 414 and the data delivery unit 450 are each disposed on the pipeline in the image processing unit 400 in the order of the calculation unit 411, the data delivery unit 450, the calculation unit 412, the calculation unit 413, and the calculation unit 414.

In the disposition of the pipeline, the image data on which the calculation unit 411 on the front stage has performed the calculation process is transferred to the calculation unit 412 on the rear stage between the calculation unit 411 and the calculation unit 412 by storing the output image data in the data delivery unit 450 at a timing at which the calculation unit 411 on the front stage outputs the image data and by outputting the stored image data at a timing at which the image data is input to the calculation unit 412 on the rear stage.

FIG. 2 illustrates the example in which the data delivery unit 450 is disposed between the calculation unit 411 and the calculation unit 412. However, as described above, the disposition on the pipeline is changed under the control of the control unit 800. Accordingly, the data delivery unit 450 can also be disposed between the calculation unit 412 and the calculation unit 413 or between the calculation unit 413 and the calculation unit 414.

FIG. 2 illustrates the configuration in which the single data delivery unit 450 is included in the image processing unit 400. However, the number of data delivery units 450 included in the image processing unit 400 is not limited to one, but a plurality of data delivery units 450 may be configured to be included. In this case, the data delivery units 450 can be disposed at a plurality of positions on the pipeline. That is, when the image processing unit 400 includes the plurality of data delivery units 450, the data delivery units 450 can be disposed not only between the calculation unit 411 and the calculation unit 412 illustrated in FIG. 2 but also between the calculation unit 412 and the calculation unit 413 and between the calculation unit 413 and the calculation unit 414.

The clock generation unit 420 generates clock signals by which the calculation units 411 to 414 and the data delivery unit 450 included in the image processing unit 400 operate, under the control of the control unit 800. The clock generation unit 420 outputs each of the generated clock signals to each of the clock selection units 431 to 434, 441, 442, and 451. FIG. 2 illustrates an example of the clock generation unit 420 that outputs a second clock CLK2 generated based on a first clock CLK1 input to the image processing unit 400.

Figure 3A:
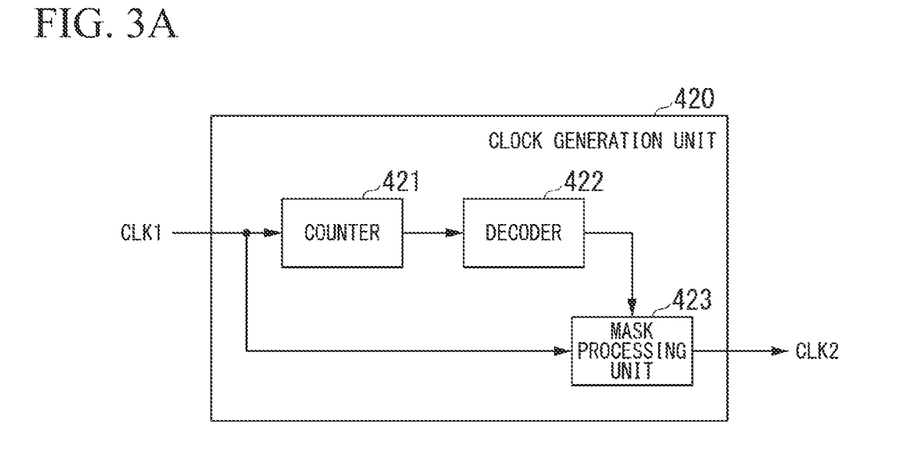
FIG. 3A is a diagram for describing an example of the configuration and operation of a clock generation unit in the image processing unit included in the imaging apparatus according to the embodiment.
Figure 3B:
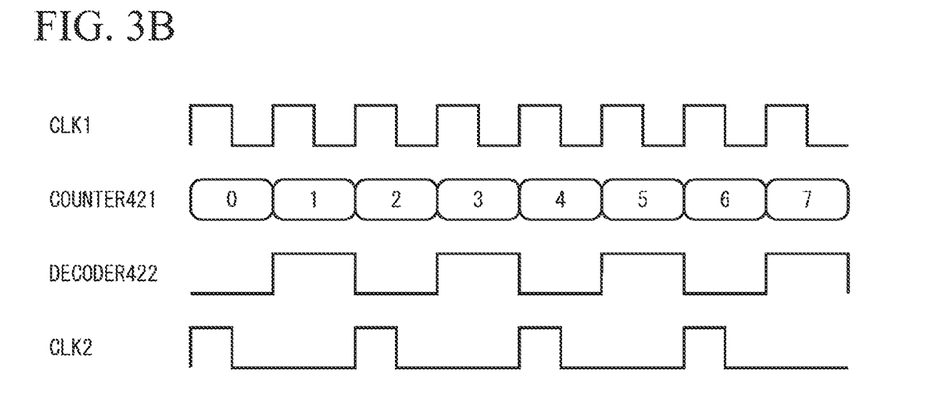
FIG. 3B is a diagram for describing an example of the configuration and operation of the clock generation unit in the image processing unit included in the imaging apparatus according to the embodiment.
Figure 3C:
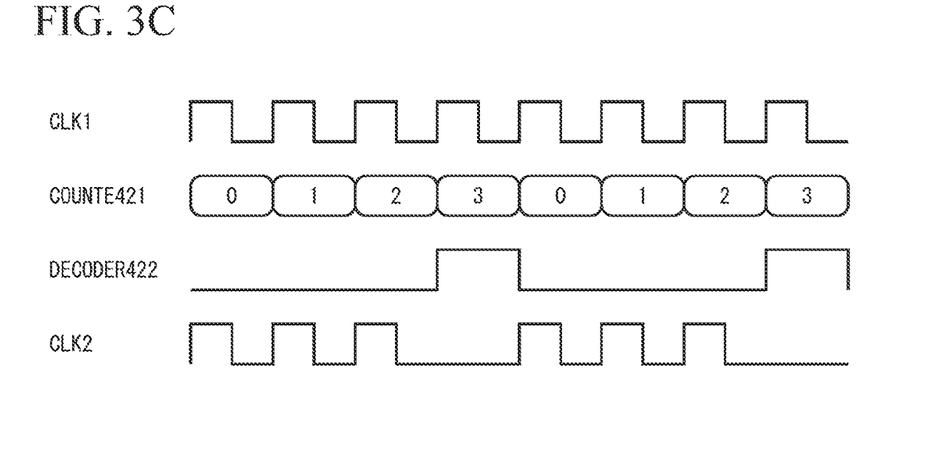
FIG. 3C is a diagram for describing an example of the configuration and operation of the clock generation unit in the image processing unit included in the imaging apparatus according to the embodiment.

Here, the clock generation unit 420 will be described. FIGS. 3A to 3C are diagrams for describing examples of the configuration and operations of the clock generation unit 420 in the image processing unit 400 included in the imaging apparatus 10 according to the embodiment. FIG. 3A illustrates an example of the configuration of the clock generation unit 420, and FIGS. 3B and 3C illustrate examples of timing charts when the clock generation unit 420 generates the second clock CLK2 based on the first clock CLK1.

First, the configuration of the clock generation unit 420 will be described. The clock generation unit 420 illustrated in FIG. 3A includes a counter (clock generation unit) 421, a decoder (clock generation unit) 422, and a mask processing unit (clock generation unit) 423. The counter 421 is a counter that performs enumerating (counting) at the timing of the first clock CLK1. The decoder 422 outputs a control signal (hereinafter referred to as a "mask signal") to mask an output of a clock pulse of the first clock CLK1 when a count value counted by the counter 421 is a value set by the control unit 800. The mask processing unit 423 masks the clock pulse of the first clock CLK1 based on the mask signal input from the decoder 422.

Subsequently, an operation of the clock generation unit 420 will be described. The timing chart illustrated in FIG. 3B is a timing chart when the clock generation unit 420 generates and outputs the second clock CLK2 having a frequency which is half (½) of the frequency of the first clock CLK1. The timing chart illustrated in FIG. 3C is a timing chart when the clock generation unit 420 generates and outputs the second clock CLK2 having a frequency which is ¾ of the frequency of the first clock CLK1. Each of the timing charts in FIGS. 3B and 3C indicates timings of each of the first clock CLK1, the count value of the counter 421, the mask signal output by the decoder 422, and the second clock CLK2.

When the second clock CLK2 having the frequency which is the half (½) of the frequency of the first clock CLK1 is generated and, for example, the counter value is odd (for example, the value of the least significant bit of the counter 421 is "1"), the control unit 800 performs setting such that the clock pulse of the first clock CLK1 is masked. Then, as illustrated in FIG. 3B, the counter 421 performs the counting at timings of the rises of the first clock CLK1. When the counter value is odd, the decoder 422 outputs a mask signal indicating that the clock pulse of the first clock CLK1 is masked (indicating that masking is performed at a "High" level in FIG. 3B) according to the setting by the control unit 800. Further, the mask processing unit 423 masks the clock pulse of the first clock CLK1 according to the mask signal. Thus, the second clock CLK2 in which the clock pulse of the "High" level of the first clock CLK1 is half-masked, i.e., the second clock CLK2 having the frequency which is ½ of the frequency of the first clock CLK1, is generated.

When the second clock CLK2 having a frequency which is ¾ of the frequency of the first clock CLK1 is generated and, for example, the counter value is "3," the control unit 800 performs setting such that the clock pulse of the first clock CLK1 is masked. Then, as illustrated in FIG. 3C, the counter 421 performs the counting at timings of the rises of the first clock CLK1. When the counter value is "3," the decoder 422 outputs a mask signal indicating that the clock pulse of the first clock CLK1 is masked (indicating that masking is performed at a "High" level in FIG. 3C) according to the setting by the control unit 800. Further, the mask processing unit 423 masks the clock pulse of the first clock CLK1 according to the mask signal. Thus, the second clock CLK2 in which the clock pulse of the "High" level of the first clock CLK1 is merely ¼-masked, i.e., the second clock CLK2 having the frequency which is ¾ of the frequency of the first clock CLK1, is generated.

When the counter 421 performs the counting as in FIG. 3B and the value of the second bit from the low order of the counter 421 is "1," the control unit 800 can perform setting such that the clock pulse of the first clock CLK1 is masked so that the second clock CLK2 is also generated as in FIG. 3C.

Thus, the clock generation unit 420 can generate the second clock CLK2 with a frequency different from that of the first clock CLK1 (a frequency lower than that of the first clock CLK1) in a simple way.

A method of generating the second clock CLK2 in the clock generation unit 420 is not limited to the above-described methods. For example, the clock generation unit 420 can also include a division circuit and the second clock CLK2 can be configured to be generated by dividing the input first clock CLK1. Further, the clock signal generated by the clock generation unit 420 is not limited to the single clock signal, but a plurality of clock signals can also be generated. For example, the second clock CLK2 having a frequency which is ½ of the frequency of the first clock CLK1 illustrated in FIG. 3B and the second clock CLK2 having a frequency which is ¾ of the frequency of the first clock CLK1 can also be configured to be generated simultaneously and the second clocks CLK2 can also be configured to be output simultaneously.

The second clock CLK2 generated by the clock generation unit 420 is not limited to the clock signal having the frequency lower than that of the first clock CLK1, as described above. For example, the second clock CLK2 having a frequency higher than that of the first clock CLK1 can also be configured to be generated. In this case, for example, the clock generation unit 420 can be considered to include a phase locked loop (PLL) to generate the second clock CLK2 having a frequency higher than that of the first clock CLK1.

The clock generation unit 420 can also be configured to include an oscillator that outputs the second clock CLK2. Further, an oscillator that outputs the first clock CLK1 may be configured to be included.

The clock selection units 431 to 434, 441, 442, and 451 select clock signals by which corresponding constituent elements operate from a plurality of input clock signals and output the clock signals under the control of the control unit 800. FIG. 2 illustrates an example in which the first clock CLK1 input to the image processing unit 400 and the second clock CLK2 generated by the clock generation unit 420 are input to each of the clock selection units 431 to 434, 441, 442, and 451, and the selected clock signal is output to the corresponding constituent elements.

More specifically, in the image processing unit 400 illustrated in FIG. 2, the clock selection unit 431 corresponds to the calculation unit 411, the clock selection unit 432 corresponds to the calculation unit 412, the clock selection unit 433 corresponds to the calculation unit 413, and the clock selection unit 434 corresponds to the calculation unit 414. Each of the clock selection units 431 to 434 selects one clock signal of the input first clock CLK1 and second clock CLK2 as the clock signal by which the corresponding calculation unit operates and outputs the clock signal.

In the image processing unit 400 illustrated in FIG. 2, the clock selection unit 451 corresponds to the data delivery unit 450. The clock selection unit 451 selects one clock signal of the input first clock CLK1 and second clock CLK2 as the clock signal when the data delivery unit 450 stores the image data, selects the other clock signal of the input first clock CLK1 and second clock CLK2 as the clock signal when the data delivery unit 450 outputs the image data, and outputs each of the selected clock signals to the data delivery unit 450. In the disposition of the data delivery unit 450 in the pipeline illustrated in FIG. 2, the clock selection unit 451 selects each of a single clock signal by which the calculation unit 411 on the front stage operates and a single clock signal by which the calculation unit 412 on the rear stage operates, and then outputs the clock signals to the data delivery unit 450.

In the image processing unit 400 illustrated in FIG. 2, the clock selection unit 441 corresponds to the input DMA unit 321 in the DMA transmission unit 320 and the clock selection unit 442 corresponds to the output DMA unit 322 in the DMA transmission unit 320. The clock selection unit 441 and the clock selection unit 442 select one clock signal of the input first clock CLK1 and second clock CLK2 as the clock signal by which the corresponding DMA transmission unit accesses the memory 600, and then output the selected clock signal.

When the clock generation unit 420 is configured to generate and output the plurality of second clocks CLK2 simultaneously, each of the clock selection units 431 to 434, 441, 442, and 451 selects the number of clock signals necessary in the corresponding constituent element from the input first clock CLK1 and the plurality of input second clocks CLK2, and then outputs the selected clock signals.

The control unit 800 controls the constituent elements of the imaging apparatus 10, i.e., the whole imaging apparatus 10. Further, the control unit 800 controls an operation of each constituent element relevant to the image processing unit 400 according to setting of an operation mode or the like of the image processing in the imaging apparatus 10 or a set value appropriate to the content of the image processing performed by the image processing unit 400 (for example, a parameter or the like of the calculation process).

More specifically, the control unit 800 changes a combination of the calculation units 411 to 414 and the data delivery unit 450 in the pipeline configured in the image processing unit 400, the order of the calculation units 411 to 414 disposed on the pipeline, or the position of the data delivery unit 450 disposed on the pipeline according to the setting of the operation mode or the like of the image processing in the imaging apparatus 10.

The control unit 800 changes the frequency of the second clock CLK2 generated by the clock generation unit 420 or the clock signal necessary to operate each constituent element relevant to the image processing unit 400 according to the setting of the operation mode or the like of the image processing in the imaging apparatus 10 or the parameter of the calculation process appropriate to the content of the image processing performed by the image processing unit 400.

More specifically, the control unit 800 changes the setting when the clock generation unit 420 generates the second clock CLK2 (for example, the setting when the clock pulse of the first clock CLK1 is masked) or the clock signals selected by the clock selection units 431 to 434, 441, 442, and 451 according to the setting of the operation mode or the like of the image processing in the imaging apparatus 10 or the parameter of the calculation process performed by the calculation units 411 to 414 included in the image processing unit 400.

When the calculation units 411 to 414 included in the image processing unit 400 perform the calculation process for each pixel or each region divided from the image, i.e., the calculation units 411 to 414 perform the calculation process for each range of the image data determined in advance, the control unit 800 can also change, for each pixel or region, the frequency of the second clock CLK2 generated by the clock generation unit 420 or the clock signals selected by the clock selection units 431 to 434, 441, 442, and 451 according to the timing at which the calculation process is performed for each pixel or region.

Thus, in the imaging apparatus 10, the proper clock signal can be supplied so that each constituent element performs the process when the control unit 800 changes the clock signal selected for each constituent element relevant to the image processing unit 400. More specifically, in an image processing apparatus of the related art, the same clock signal is uniformly supplied to each constituent element even when the calculation process is not actually performed on the image data (non-processing time). However, in the imaging apparatus 10, the clock signal supplied to each constituent element can be changed, for example, a late clock signal (a clock signal with a low frequency) can be supplied to the constituent element of which a processing amount of the calculation process to be performed is small. Thus, in the imaging apparatus 10, each of the calculation units 411 to 414 included in the image processing unit 400 can reduce the non-processing time in which the calculation process is not actually performed on the image data, and thus it is possible to reduce extra power consumption of the image processing unit 400 in the supply of the clock signal during the non-processing time.

Here, an example of an operation of the image processing unit 400 according to an operation mode of the image processing in the imaging apparatus 10 according to the embodiment will be described.

Figure 4:
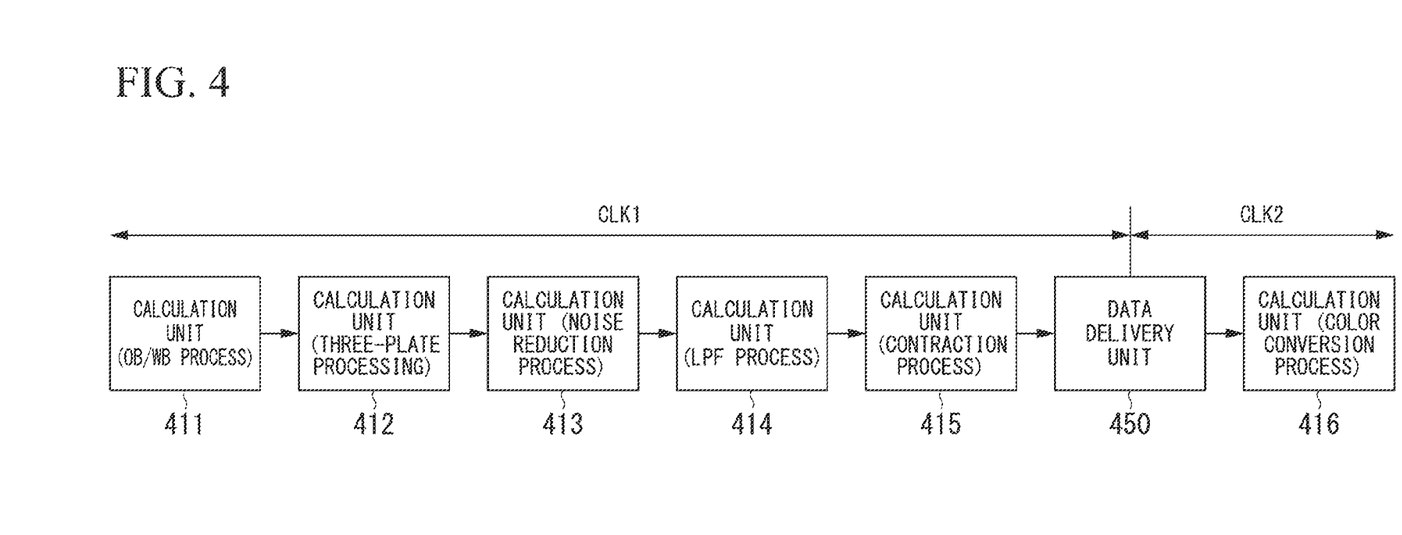
FIG. 4 is a diagram illustrating the configuration of a pipeline when first image processing is performed by the image processing unit included in the imaging apparatus according to the embodiment.

<First Image Processing Operation>

FIG. 4 is a diagram illustrating the configuration of a pipeline when the image processing unit 400 included in the imaging apparatus 10 according to the embodiment performs first image processing. The first image processing is image processing for generating a contracted image corresponding to a photographed image captured by the image sensor 100, i.e., a thumbnail image. In the first image processing, a thumbnail image is generated by sequentially performing calculation processes such as an optical black (OB)/white balance (WB) process, three-plate processing, a noise reduction process, lowpass filter (LPF) processing, a contraction process, and a color conversion process.

In the configuration of the pipeline illustrated in FIG. 4, the calculation unit 411 performs the OB/WB process, the calculation unit 412 performs the three-plate processing, the calculation unit 413 performs the noise reduction process, the calculation unit 414 performs the LPF process, the calculation unit 415 performs the contraction process, and the calculation unit 416 performs the color conversion process.

In the first image processing, for the calculation processes up to the OB/WB process, the three-plate processing, the noise reduction process, the LPF process, and the contraction process, a processing amount of the calculation process to be performed is large since the image data of the entire region of the photographed image captured by the image sensor 100 is calculation target image data to be subjected to the calculation process. However, for the color conversion process, a processing amount of the calculation process to be performed is small since the image data of the entire region of the image contracted through the contraction process is calculation target image data to be subjected to the calculation process. Therefore, when the color conversion process is performed at the same timing of the clock signal as that of the calculation processes up to the OB/WB process, the three-plate processing, the noise reduction process, the LPF process, and the contraction process, the calculation of the color conversion process is completed earlier. Thus, a non-processing time in which the calculation of the color conversion process is not actually performed may occur.

For example, when an image with a VGA size is contracted to an image with a QVGA size in the contraction process performed by the calculation unit 415, the size of the image subjected to the calculation process becomes a ¼ size, i.e., a processing amount of the calculation process becomes ¼. Therefore, when the frequency of the clock signal by which the calculation unit 416 performing the color conversion process operates is set to be the same as the frequency of the clock signal by which the calculation units 411 to 415 performing the calculation process up to the OB/WB process, the three-plate process, the noise reduction process, the LPF process, and the contraction process operate, a period corresponding to 75% of the period in which the calculation unit 416 performs the color conversion process may become a non-processing time in which the color conversion process in not actually performed. Thus, the calculation unit 416 may consume extra power.

Accordingly, as illustrated in FIG. 4, the control unit 800 disposes the data delivery unit 450 between the calculation unit 415 performing the contraction process and the calculation unit 416 performing the color conversion process in the first image processing and forms the pipeline so that the data delivery unit 450 transfers the image data subjected to the contraction process by the calculation unit 415 to the calculation unit 416. Then, the control unit 800 reduces the non-processing time of the calculation unit 416 by causing the calculation unit 416 to perform the color conversion process with a late clock signal (a clock signal with a low frequency).

More specifically, the control unit 800 causes the clock generation unit 420 to generate the second clock CLK2 with a frequency lower than that of the first clock CLK1. Further, as illustrated in FIG. 4, the control unit 800 changes the clock signals selected by the respective clock selection units corresponding to the calculation units 411 to 416 and the data delivery unit 450 so that the calculation units 411 to 415 are operated by the first clock CLK1 and the calculation unit 416 is operated by the second clock CLK2. Furthermore, the control unit 800 also changes the clock signals selected by the respective clock selection units corresponding to the input DMA unit 321 and the output DMA unit 322 so that the input DMA unit 321 is operated by the first clock CLK1 and the output DMA unit 322 is operated by the second clock CLK2.

The frequency of the second clock CLK2 generated by the clock generation unit 420 is determined according to the content of the first image processing performed by the image processing unit 400, i.e., a parameter of the calculation process relevant to the generation of the contracted image (for example, a parameter determining a contraction ratio of the contracted image).

For example, when an image with a VGA size is contracted to an image with a QVGA size in the contraction process performed by the calculation unit 415, as described above, the size of the image becomes a ¼ size. That is, a contraction ratio of the contracted image is ¼. Therefore, the control unit 800 performs setting such that the clock generation unit 420 generates the frequency of the second clock CLK2 which is ¼ of the frequency of the first clock CLK1 and supplies the frequency of the second clock CLK2 to the calculation unit 416. More specifically, for example, when the frequency of the first clock CLK1 is 200 MHz, the clock generation unit 420 generates the second clock CLK2 with a frequency of 200 MHz/4=50 MHz and supplies the second clock CLK2 to the calculation unit 416. Thus, the calculation unit 416 performs the color conversion process during the same period and the power consumption can be reduced to ¼. At this time, the data delivery unit 450 stores the image data subjected to the contraction process by the calculation unit 415 at a timing of 200 MHz and outputs the stored image data to the calculation unit 416 at a timing of 50 MHz.

Thus, in the first image processing operation, as illustrated in FIG. 4, by switching the clock signals between the calculation unit 415 performing the contraction process and the calculation unit 416 performing the color conversion process, it is possible to reduce the power consumption of the calculation unit 416 in the first image processing without extending a period necessary in the first image processing.

<Second Image Processing Operation>

Figure 5:
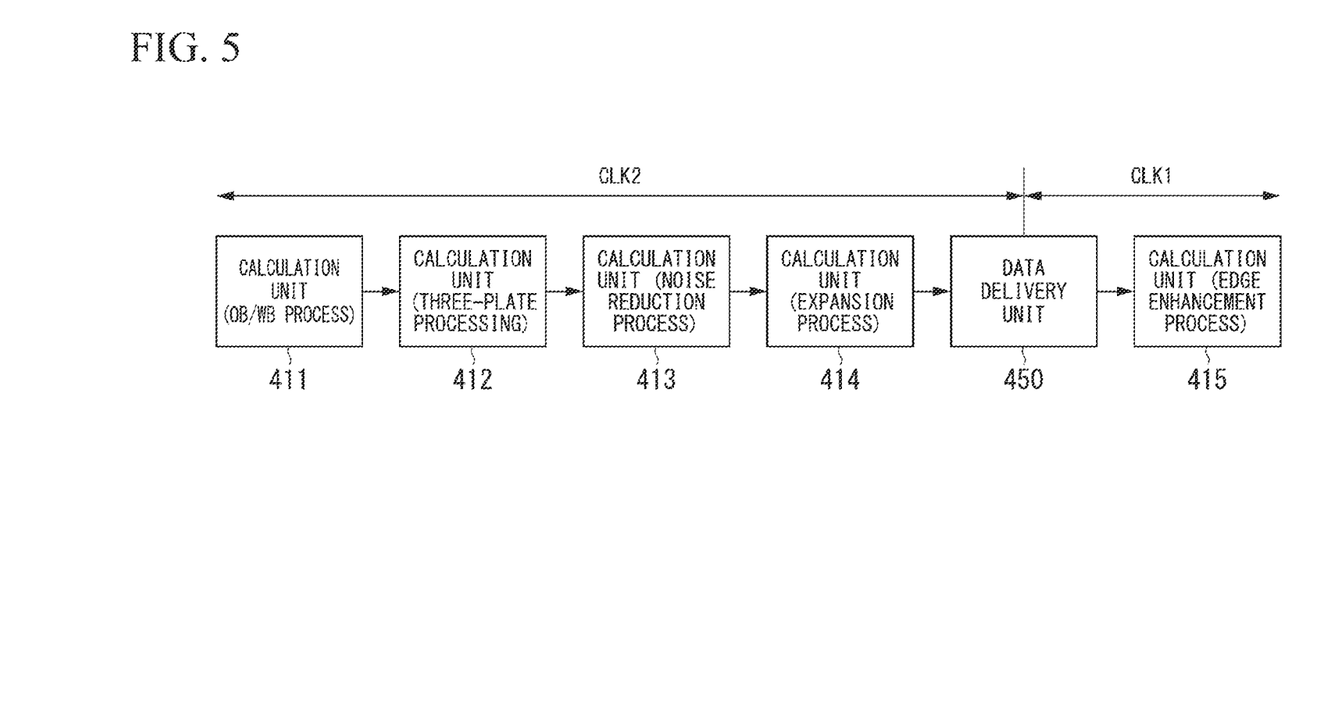
FIG. 5 is a diagram illustrating the configuration of a pipeline when second image processing is performed by the image processing unit included in the imaging apparatus according to the embodiment.

FIG. 5 is a diagram illustrating the configuration of a pipeline when the image processing unit 400 included in the imaging apparatus 10 according to the embodiment performs second image processing. The second image processing is image processing for generating a partially expanded image obtained by partially expanding a photographed image captured by the image sensor 100, i.e., a digital zoom image. In the second image processing, the digital zoom image is generated by sequentially performing calculation processes such as an OB/WB process, three-plate processing, a noise reduction process, an expansion process, and an edge enhancement process.

In the configuration of the pipeline illustrated in FIG. 5, the calculation unit 411 performs the OB/WB process, the calculation unit 412 performs the three-plate processing, the calculation unit 413 performs the noise reduction process, the calculation unit 414 performs the expansion process, and the calculation unit 415 performs the edge enhancement process.

In the second image processing, for the edge enhancement process, a processing amount of the calculation process to be performed is large since the image data of the entire region of an image expanded through the expansion process is calculation target image data to be subjected to the calculation process. However, for the calculation processes up to the OB/WB process, the three-plate processing, the noise reduction process, and the expansion process, a processing amount of the calculation process to be performed is small since the image data of a partial region of the photographed image photographed by the image sensor 100 is calculation target image data subjected to the calculation process. Therefore, when the calculation processes up to the OB/WB process, the three-plate processing, the noise reduction process, and the expansion process are performed at the same timing of the clock signal as that of the edge enhancement process, a process waiting time (non-processing time) in which the calculation of the subsequent OB/WB process, three-plate processing, noise reduction process, and expansion process does not start until completion of the edge enhancement process may occur. That is, a non-processing time in which the calculation processes of the OB/WB process, the three-plate processing, the noise reduction process, and the expansion process are not actually performed may occur.

For example, when an image with a QVGA size is expanded to an image with a VGA size in the expansion process performed by the calculation unit 414, the size of the image subjected to the edge enhancement process becomes a 4-times size, i.e., the processing amount of the calculation process becomes 4 times. Therefore, when the frequency of the clock signal by which the calculation units 411 to 414 performing the calculation processes up to the OB/WB process, the three-plate processing, the noise reduction process, and the expansion process operate is set to be the same as the frequency of the clock signal by which the calculation unit 415 performing the edge enhancement process operates, the calculation processes up to the OB/WB process, the three-plate processing, the noise reduction process, and the expansion process are completed during a period corresponding to 25% of the period in which the calculation unit 415 performs the edge enhancement process. In other words, since the calculation processes up to the OB/WB process, the three-plate processing, the noise reduction process, and the expansion process are performed at a speed of 4 times (400%), a period corresponding to 75% of the processing period of the edge enhancement process may be a non-processing time in which the calculation processes up to the OB/WB process, the three-plate processing, the noise reduction process, and the expansion process are not actually performed. Thus, the calculation units 411 to 414 may consume extra power.

Accordingly, as illustrated in FIG. 5, the control unit 800 disposes the data delivery unit 450 between the calculation unit 414 performing the expansion process and the calculation unit 415 performing the edge enhancement process in the second image processing and forms the pipeline so that the data delivery unit 450 transfers the image data subjected to the expansion process by the calculation unit 414 to the calculation unit 415. Then, the control unit 800 reduces the non-processing time of the calculation units 411 to 414 by causing the calculation units 411 to 414 to perform the calculation processes up to the OB/WB process, the three-plate processing, the noise reduction process, and the expansion process by a late clock signal (a clock signal with a low frequency).

More specifically, the control unit 800 causes the clock generation unit 420 to generate the second clock CLK2 with a frequency lower than that of the first clock CLK1. Further, as illustrated in FIG. 5, the control unit 800 changes the clock signals selected by the respective clock selection units corresponding to the calculation units 411 to 415 and the data delivery unit 450 so that the calculation units 411 to 414 are operated by the second clock CLK2 and the calculation unit 415 is operated by the first clock CLK1. Furthermore, the control unit 800 also changes the clock signals selected by the respective clock selection units corresponding to the input DMA unit 321 and the output DMA unit 322 so that the input DMA unit 321 is operated by the second clock CLK2 and the output DMA unit 322 is operated by the first clock CLK1.

The frequency of the second clock CLK2 generated by the clock generation unit 420 is determined according to the content of the second image processing performed by the image processing unit 400, i.e., a parameter of the calculation process relevant to the generation of the partially expanded image (for example, a parameter determining an expansion ratio of the partially expanded image).

For example, when an image with a QVGA size is expanded to an image with a VGA size in the contraction process performed by the calculation unit 414, as described above, the size of the image becomes a quadruple size. That is, an expansion ratio of the partially expanded image is 4. Therefore, the control unit 800 considers the first clock CLK1 to be the clock signal with the quadruple frequency and conversely performs setting such that the clock generation unit 420 generates the frequency of the second clock CLK2 which is ¼ of the frequency of the first clock CLK1 and supplies the frequency of the second clock CLK2 to the calculation units 411 to 414. More specifically, for example, when the frequency of the first clock CLK1 is 200 MHz, the clock generation unit 420 generates the second clock CLK2 with a frequency of 200 MHz/4=50 MHz and supplies the second clock CLK2 to the calculation units 411 to 414. Thus, the calculation units 411 to 414 perform the calculation processes up to the OB/WB process, the three-plate processing, the noise reduction process, and the expansion process during the same period in which the calculation unit 415 performs the edge enhancement process and the power consumption can be reduced to ¼. At this time, the data delivery unit 450 stores the image data subjected to the expansion process by the calculation unit 414 at a timing of 50 MHz and outputs the stored image data to the calculation unit 415 at a timing of 200 MHz.

Thus, in the second image processing operation, as illustrated in FIG. 5, by switching the clock signals between the calculation unit 414 performing the expansion process and the calculation unit 415 performing the edge enhancement process, it is possible to reduce the power consumption of the calculation units 411 to 414 in the second image processing without extending a period necessary in the second image processing.

Further, in the second image processing operation, the case in which the calculation processes up to the OB/WB process, the three-plate processing, the noise reduction process, and the expansion process are performed by the late clock signal (the clock signal with the low frequency) has been described. However, by performing the edge enhancement process performed by the calculation unit 415 with an earlier clock signal (a clock signal with a high frequency) than the calculation processes up to the OB/WB process, the three-plate processing, the noise reduction process, and the expansion process performed by the calculation units 411 to 414, the entire processing time of the second image processing can also be configured to be shortened.

For example, when an image with a QVGA size is expanded to an image with a VGA size in the expansion process performed by the calculation unit 414, the processing amount of the edge enhancement process is 4 times. Therefore, the clock signal by which the calculation unit 415 operates is set to be 4 times. More specifically, the control unit 800 causes the clock generation unit 420 to generate the second clock signal CLK2 with a frequency four times the frequency of the first clock CLK1. Further, the control unit 800 changes the clock signal selected by the clock selection unit corresponding to each of the calculation units 411 to 415, the data delivery unit 450, the input DMA unit 321, and the output DMA unit 322 so that the calculation units 411 to 414 are operated by the first clock signal CLK1 and the calculation unit 415 is operated by the second clock CLK2. Thus, the processing time of the calculation processes up to the OB/WB process, the three-plate processing, the noise reduction process, and the expansion process becomes the same as the processing time of the edge enhancement process. Thus, since it is possible to reduce the time (non-processing time) in which the calculation units 411 to 414 wait for start of the calculation of the subsequent OB/WB process, three-plate processing, noise reduction process, and expansion process until the edge enhancement process is completed, the entire processing time of the second image processing can be configured to be shortened.

<Third Image Processing Operation>

Figure 6:
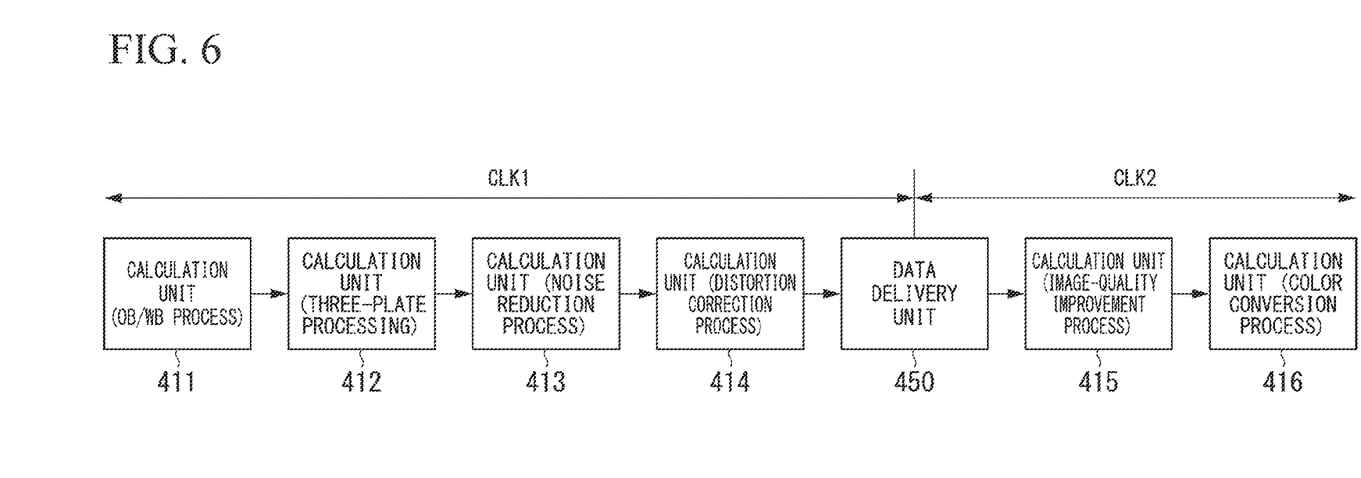
FIG. 6 is a diagram illustrating the configuration of a pipeline when third image processing is performed by the image processing unit included in the imaging apparatus according to the embodiment.

FIG. 6 is a diagram illustrating the configuration of a pipeline when the image processing unit 400 included in the imaging apparatus 10 according to the embodiment performs third image processing. In general, in an optical system of a camera, i.e., a lens included in the imaging apparatus 10, there is distortion of the optical system. Therefore, the imaging-processed data obtained through the imaging process performed by the imaging processing unit 200 on the pixel signal of the photographed image with the Bayer array input from the image sensor 100 and stored (written) in the memory 600 is image data with distortion of the optical system by a lens. The third image processing is image processing for generating a distortion-corrected image obtained by correcting distortion of the optical system contained in the photographed image captured by the image sensor 100. In the third image processing, the distortion-corrected image is generated by sequentially performing calculation processes such as an OB/WB process, three-plate processing, a noise reduction process, a distortion correction process, an image-quality improvement process, and a color conversion process.

In the configuration of the pipeline illustrated in FIG. 6, the calculation unit 411 performs the OB/WB process, the calculation unit 412 performs the three-plate processing, the calculation unit 413 performs the noise reduction process, the calculation unit 414 performs the distortion correction process, the calculation unit 415 performs the image-quality improvement process, and the calculation unit 416 performs the color conversion process.

In the third image processing, for the calculation processes up to the OB/WB process, the three-plate processing, the noise reduction process, and the distortion correction process, a processing amount of the calculation process to be performed is large since the image data of a region of an image and its peripheral region displayed on the display device 501 by the imaging apparatus 10 or recorded on a recording medium (not illustrated) is calculation target image data to be subjected to the calculation process, i.e., the calculation process is performed on an image with a size larger than the size of an image to be displayed or recorded. However, for the image-quality improvement process and the color conversion process, a processing amount of the calculation process to be performed is small since the image data of the region of the image of which distortion is corrected through the distortion correction process is calculation target image data to be subjected to the calculation process, i.e., the calculation process is performed on the image with the size to be displayed or recorded. Therefore, when the image-quality improvement process and the color conversion process are performed at the same timing of the clock signal as that of the calculation processes up to the OB/WB process, the three-plate processing, the noise reduction process, and the distortion correction process, the calculation of the image-quality improvement process and the color conversion process is completed earlier. Thus, a non-processing time in which the calculation of the image-quality improvement process and the color conversion process is not actually performed may occur. Accordingly, the calculation unit 415 performing the image-quality improvement process and the calculation unit 416 performing the color conversion process may consume extra power.

Accordingly, as illustrated in FIG. 6, the control unit 800 disposes the data delivery unit 450 between the calculation unit 414 performing the distortion correction process and the calculation unit 415 performing the image-quality improvement process in the third image processing and forms the pipeline so that the data delivery unit 450 transfers the image data subjected to the distortion correction process by the calculation unit 414 to the calculation unit 415. Then, the control unit 800 reduces the non-processing time of the calculation units 415 and 416 by causing the calculation unit 415 to perform the image-quality improvement process and causing the calculation unit 416 to perform the color conversion process by a late clock signal (a clock signal with a low frequency).

More specifically, the control unit 800 causes the clock generation unit 420 to generate the second clock CLK2 with a frequency lower than that of the first clock CLK1. Further, as illustrated in FIG. 6, the control unit 800 changes the clock signals selected by the respective clock selection units corresponding to the calculation units 411 to 416 and the data delivery unit 450 so that the calculation units 411 to 414 are operated by the first clock CLK1 and the calculation units 415 and 416 are operated by the second clock CLK2. Furthermore, the control unit 800 also changes the clock signals selected by the respective clock selection units corresponding to the input DMA unit 321 and the output DMA unit 322 so that the input DMA unit 321 is operated by the first clock CLK1 and the output DMA unit 322 is operated by the second clock CLK2.

The frequency of the second clock CLK2 generated by the clock generation unit 420 is determined according to the content of the third image processing performed by the image processing unit 400, i.e., a parameter of the calculation process relevant to the generation of the distortion-corrected image (for example, a correction amount determined according to a distortion amount of the optical system, i.e., a parameter of the distortion correction amount).

Thus, in the third image processing operation, as illustrated in FIG. 6, by switching the clock signals between the calculation unit 414 performing the distortion correction process and the calculation unit 415 performing the image-quality improvement process, it is possible to reduce the power consumption of the calculation units 415 and 416 in the third image processing while shortening a period necessary in the third image processing.

In the distortion correction process, the entire region (a region in which the region of an image to be displayed or recorded and its peripheral region are combined) of a photographed image captured by the image sensor 100 in which the region of an image to be displayed or recorded and its peripheral region are combined is divided into a plurality of regions determined in advance, and each of the divided regions is corrected. At this time, the distortion correction amount is different for each of the divided regions. This is because the amount of distortion such as barreled distortion of an optical system is small near the optical center of a lens and increases toward the outer circumference of the lens. Accordingly, the distortion correction amount is small at the center of an image and increases toward its circumference. For example, when the entire region of a photographed image is divided into nine regions, a distortion correction amount is the largest in the regions at the four corners of the image, a distortion correction amount is smaller in the four regions located between the regions at the four corners than in the regions at the four corners, and a distortion correction amount is the smallest in the one central region of the image. Thus, in the distortion correction process, the calculation process is performed using more image data in the peripheral regions than in the central region of the image. Thus, a processing amount of the distortion correction process performed by the calculation unit 414 is greater in the peripheral region than in the central region of the image. Therefore, the control unit 800 preferably changes the frequency of the second clock CLK2 generated by the clock generation unit 420 for each of the regions subjected to the distortion correction process. Thus, compared to the case of performing the distortion correction process on the entire image in accordance with the distortion correction amount of the regions at the four corners of the image, it is possible to reduce the power consumption of the calculation units 415 and 416 in the third image processing while further reducing the entire processing time of the third image processing.

In the embodiment, as described above, the clock signal supplied to operate each of the calculation units forming the pipeline in the image processing unit is switched to the clock signal with a proper frequency for each calculation unit according to the setting of the operation mode or the like of the image processing performed by the image processing unit included in the imaging apparatus or the set value such as the parameter of the calculation process appropriate to the content of the image processing. More specifically, for example, the clock signal to be supplied is changed for each calculation unit, e.g., the late clock signal (the clock signal with a low frequency) is supplied to the calculation unit of which the processing amount of the calculation process to be performed is small. Thus, in the embodiment, it is possible to reduce the non-processing time in which the calculation process is not actually performed according to the processing content of each calculation unit in the image processing unit. Thus, in the embodiment, it is possible to reduce the extra power consumed by the calculation unit that does not perform the calculation process by supplying the clock signal during the non-processing time, and it is possible to reduce the power consumption when the image processing unit performs the image processing.

In the embodiment, the case in which the image processing unit 400 is configured to include the single data delivery unit 450 has been described. However, the number of data delivery units 450 included in the image processing unit 400 is not limited to one, but the plurality of data delivery units 450 may be configured to be included. At this time, since the clock selection unit 451 corresponding to each data delivery unit 450 selects the clock signal to operate the calculation unit before and after the corresponding data delivery units 450, each clock selection unit 451 may select two different clock signals.

In the embodiment, the case in which the control unit 800 is an external constituent element of the image processing unit 400 has been described. However, the image processing unit 400 can also be configured to have a function of changing the frequency of the second clock CLK2 or the selection of the clock signal supplied to each calculation unit in the control unit 800.

In the embodiment, the case in which the clock generation unit 420 is an internal constituent element of the image processing unit 400 has been described. However, the clock generation unit 420 can also be configured as an external constituent element of the image processing unit 400.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:
1. An image processing device which includes a plurality of calculation units performing a calculation process on input image data and outputting the image data, changes at least one of a combination of the calculation units forming a pipeline and an order of the calculation units disposed on the pipeline in accordance with setting of an operation mode of image processing, and performs the image processing in accordance with the setting of the operation mode of the image processing, the image processing device comprising:
- a plurality of clock selection units configured to respectively correspond to the calculation units forming the pipeline and to select a clock signal to be supplied to the corresponding calculation unit from a plurality of input clock signals and output the clock signal;
- a data delivery unit disposed on the pipeline between the calculation unit to which a first clock signal is input and the calculation unit to which a second clock signal with a frequency different from a frequency of the first clock signal is input and configured to output the image data subjected to the calculation process and output at a timing of one of the first and second clock signals, at a timing of another of the first and second clock signals; and
- a control unit configured to control a selection of the clock signal by each of the clock selection units, a combination of the data delivery unit and the calculation units forming the pipeline, and an order of the data delivery unit and the calculation units disposed on the pipeline in accordance with the operation mode of the image processing.

2. The image processing device according to claim 1, further comprising:
- a clock generation unit configured to generate the second clock signal based on the first clock signal,
- wherein the control unit controls the frequency of the second clock signal generated by the clock generation unit.

3. The image processing device according to claim 2, wherein the control unit controls the frequency of the second clock signal generated by the clock generation unit based on at least one of the setting of the operation mode of the image processing, a set value appropriate to content of the image processing performed by the image processing device, and a range of the image processing performed on the image data by the image processing device.

4. The image processing device according to claim 3, wherein the control unit controls the clock generation unit such that the second clock signal with the frequency lower than the frequency of the first clock signal is generated.

5. The image processing device according to claim 4,
- wherein the operation mode of the image processing is setting in which a contracted image contracted from an image configured by the image data is generated, and
- wherein the control unit determines the frequency of the second clock signal based on a set value of a contraction ratio when the image is contracted, causes each of the clock selection units disposed on the pipeline and corresponding to the calculation unit performing a contraction process and the calculation unit on a front stage of the calculation unit performing the contraction process to select the first clock signal, and causes each of the clock selection units disposed on the pipeline and corresponding to the calculation units on a rear stage of the calculation unit performing the contraction process to select the second clock signal.

6. The image processing device according to claim 4,
- wherein the operation mode of the image processing is setting in which a partially expanded image which is partially expanded from an image configured by the image data is generated, and
- wherein the control unit determines the frequency of the second clock signal based on a set value of an expansion ratio when the image is expanded, causes each of the clock selection units disposed on the pipeline and corresponding to the calculation unit performing an expansion process and the calculation unit on a front stage of the calculation unit performing the expansion process to select the second clock signal, and causes each of the clock selection units disposed on the pipeline and corresponding to the calculation units on a rear stage of the calculation unit performing the expansion process to select the first clock signal.

7. The image processing device according to claim 4,
- wherein the operation mode of the image processing is setting in which a distortion-corrected image obtained by correcting distortion of an image configured by the image data is generated, and
- wherein the control unit determines the frequency of the second clock signal based on a set value of a distortion correction amount when the distortion of the image is corrected, causes each of the clock selection units disposed on the pipeline and corresponding to the calculation unit performing a distortion correction process and the calculation unit on a front stage of the calculation unit performing the distortion correction process to select the first clock signal, and causes each of the clock selection units disposed on the pipeline and corresponding to the calculation units on a rear stage of the calculation unit performing the distortion correction process to select the second clock signal.

8. An image processing method performed by an image processing device which includes a plurality of calculation units performing a calculation process on input image data and outputting the image data, changes at least one of a combination of the calculation units forming a pipeline and an order of the calculation units disposed on the pipeline in accordance with setting of an operation mode of image processing, and performs the image processing in accordance with the setting of the operation mode of the image processing, the image processing method comprising:
- selecting, by a plurality of clock selection units respectively corresponding to the calculation units forming the pipeline, a clock signal to be supplied to the corresponding calculation unit from a plurality of input clock signals and outputting the clock signal;
- outputting, by a data delivery unit disposed on the pipeline between the calculation unit to which a first clock signal is input and the calculation unit to which a second clock signal with a frequency different from a frequency of the first clock signal is input, the image data subjected to the calculation process and output at a timing of one of the first and second clock signals, at a timing of another of the first and second clock signals; and
- controlling, by a control unit, a selection of the clock signal by each of the clock selection units, a combination of the data delivery unit and the calculation units forming the pipeline, and an order of the data delivery unit and the calculation units disposed on the pipeline in accordance with the operation mode of the image processing.

9. An imaging apparatus comprising:
- a solid-state imaging device configured to include a plurality of pixels and output a pixel signal obtained by photoelectrically converting a signal of each of the pixels in accordance with incident subject light;
- a storage unit that stores image data in accordance with the pixel signal output by the solid-state imaging device; and
- the image processing device according to claim 1 configured to perform the image processing on the image data stored in the storage unit in accordance with the setting of the operation mode of the image processing.

* * * * *